(12) United States Patent
Platzker et al.

(10) Patent No.: US 8,719,747 B2
(45) Date of Patent: May 6, 2014

(54) SINGLE EVENT UPSET MITIGATION FOR ELECTRONIC DESIGN SYNTHESIS

(75) Inventors: Daniel Platzker, Saratoga, CA (US); Jeffrey Alan Kaady, San Jose, CA (US); Ashish Kapoor, West Linn, OR (US)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 13/362,605

(22) Filed: Jan. 31, 2012

(65) Prior Publication Data

US 2013/0198701 A1 Aug. 1, 2013

(51) Int. Cl.
*G06F 17/50* (2006.01)
*G06F 9/455* (2006.01)

(52) U.S. Cl.
USPC ........... 716/113; 716/104; 716/106; 716/108; 716/111; 716/112; 716/114; 716/132; 716/134; 716/136

(58) Field of Classification Search
USPC ......... 716/104, 106, 108, 111, 112, 113, 114, 716/132, 134, 136
See application file for complete search history.

(56) References Cited

U.S. PATENT DOCUMENTS

| | | | | |
|---|---|---|---|---|
| 5,604,753 A * | 2/1997 | Bauer et al. | ........... | 714/763 |
| 5,673,199 A * | 9/1997 | Gentry | ........... | 703/1 |
| 6,910,193 B1 * | 6/2005 | McBride | ........... | 716/106 |
| 6,922,817 B2 * | 7/2005 | Bradfield et al. | ........... | 716/113 |
| 6,954,916 B2 * | 10/2005 | Bernstein et al. | ........... | 716/112 |
| 7,107,558 B2 * | 9/2006 | Tetelbaum et al. | ........... | 716/113 |
| 7,343,578 B1 * | 3/2008 | Patterson et al. | ........... | 716/117 |
| 7,689,957 B2 * | 3/2010 | Shenoy | ........... | 716/113 |
| 7,698,674 B2 * | 4/2010 | Kalafala et al. | ........... | 716/113 |
| 7,714,610 B2 * | 5/2010 | He | ........... | 326/41 |
| 7,886,246 B2 * | 2/2011 | Buck et al. | ........... | 716/108 |
| 7,913,210 B2 * | 3/2011 | Albrecht et al. | ........... | 716/107 |
| 7,962,876 B2 * | 6/2011 | Oh et al. | ........... | 716/113 |
| 8,294,159 B2 * | 10/2012 | Or-Bach et al. | ........... | 257/74 |
| 8,307,316 B2 * | 11/2012 | Albrecht et al. | ........... | 716/113 |
| 8,453,102 B1 * | 5/2013 | Pack et al. | ........... | 716/139 |
| 2008/0127028 A1 * | 5/2008 | Rittman | ........... | 716/19 |
| 2010/0281448 A1 * | 11/2010 | He | ........... | 716/6 |
| 2012/0124421 A1 * | 5/2012 | Whatmough et al. | ........... | 714/26 |
| 2013/0061104 A1 * | 3/2013 | Hartl | ........... | 714/741 |

FOREIGN PATENT DOCUMENTS

DE 102010040035 A1 * 9/2011

OTHER PUBLICATIONS

Chong et al.; "Intelligent Robustness Insertion for Optimal Transient Error Tolerance Improvement in VLSI Circuits"; Publication Year: 2008; Very Large Scale Integration (VLSI) Systems, IEEE Transactions on; vol. 16 , Issue: 6; pp. 714-724.*

(Continued)

*Primary Examiner* — Helen Rossoshek
(74) *Attorney, Agent, or Firm* — Banner & Witcoff, Ltd.

(57) ABSTRACT

Technology is disclosed herein that provides for modifying a circuit design to reduce the potential occurrence of single event upset errors during operation of a device manufactured from the synthesized design. After a circuit design has been synthesized to a particular abstraction level, a static timing analysis procedure is run on the design. The slack values for paths within the design are determined based upon the static timing analysis procedure. Subsequently, delays are added to selected paths within the design based upon the slack values.

16 Claims, 5 Drawing Sheets

(56) References Cited

OTHER PUBLICATIONS

Chong et al.; "Evaluating and Improving Transient Error Tolerance of CMOS Digital VLSI Circuits"; Publication Year: 2006; Test Conference, 2006. ITC '06. IEEE International; pp. 1-10.*

Zhao et al.; "Evaluating and Improving Transient Error Tolerance of CMOS Digital VLSI Circuits"; Publication Year: 2006; Test Conference, 2006. ITC '06. IEEE International; , pp. 1-10; Cited by: Papers (4).*

* cited by examiner

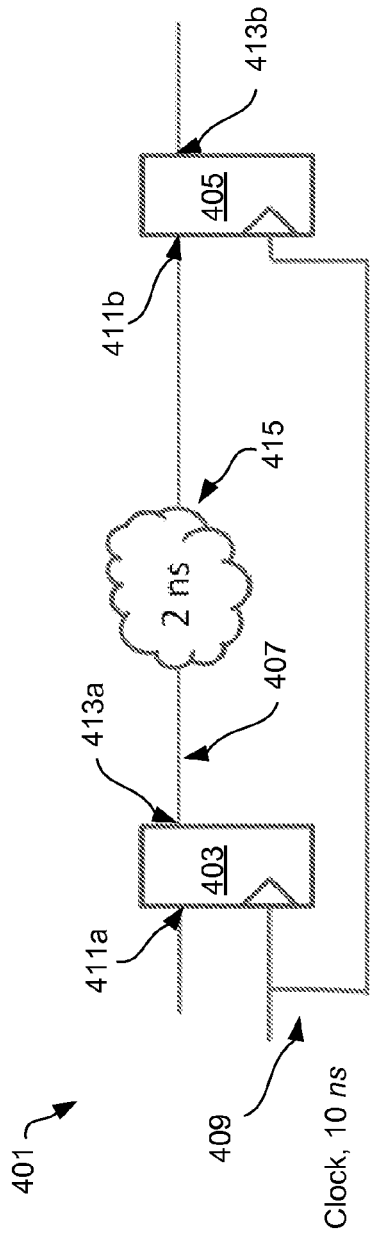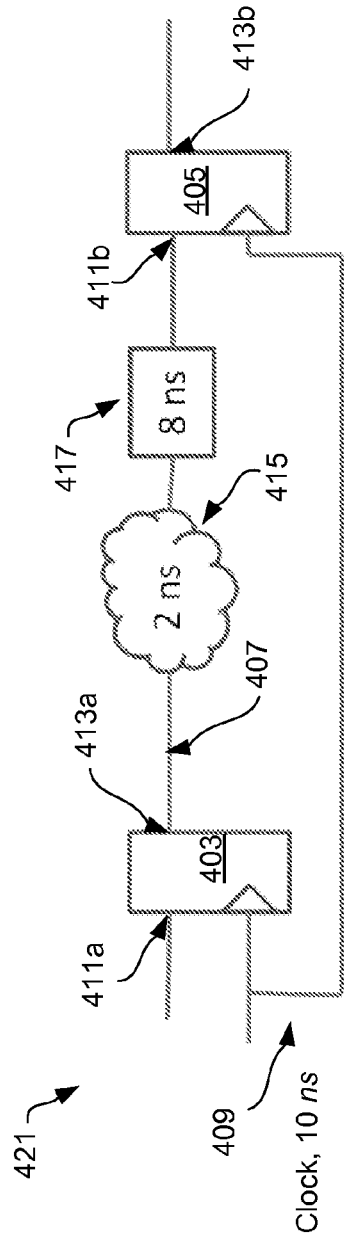
FIGURE 4A
FIGURE 4B

SINGLE EVENT UPSET MITIGATION FOR ELECTRONIC DESIGN SYNTHESIS

FIELD

The present application is directed towards the field of electronic device design synthesis.

BACKGROUND

Electronic circuits, such as integrated circuits, are used in a variety of electronic systems, from automobiles to microwaves to personal computers. Designing and fabricating circuits typically involves many steps, known as a "design flow." The particular steps of a design flow often are dependent upon the type of circuit being designed, its complexity, the design team and the circuit fabricator or foundry that will manufacture the circuit. Software and hardware "tools" are typically used at various stages of the design flow to aid in developing the design and in ensuring that the design is free from errors. The process of using hardware and software tools to aid in the design flow is often referred to as electronic design automation (EDA).

Several steps are common to most design flows. Typically, the specification for a new circuit is first described at a very abstract level. More particularly, relationships between a set of inputs and a set of outputs are described using a set of computations. This is referred to as an "algorithmic level" design or "algorithmic specification" and is often described using conventional computer programming languages, such as, for example, C++. The algorithmic specification is then subsequently transformed, often referred to as "synthesized," into a design having a lower level of abstraction.

Typically, designers synthesize the algorithmic specification into a Register Transfer Level (RTL) description of the circuit. With this type of description, the circuit is defined in terms of both the exchange of signals between hardware registers and the logical operations that are performed on those signals. Subsequently, the design is further synthesized into lower and lower levels of abstraction. For example, the register transfer level design may be synthesized into a gate-level design. At each abstraction level, the design is typically described by a hardware description language (HDL), such as, for example, the Very high speed integrated circuit Hardware Design Language (VHDL).

The gate-level design, which is typically in the form of a schematic or netlist, describes the specific electronic devices (such as transistors, resistors, and capacitors) that will be used in the circuit, along with their interconnections. This gate-level design generally corresponds to the level of representation displayed in conventional circuit diagrams. The gate-level design can then be synthesized into a design for a mask, which, as those of ordinary skill in the art will appreciate, is used to manufacture the design.

During various stages of the design flow, the behavior of the design is checked to ensure that it corresponds with the intended or expected behavior. This is often referred to as "verification." If errors in the design are found during verification, they can be corrected at this stage of the design process. Additionally, the design may be modified to account for known effects that may cause errors during the operation of the design. One known effect is referred to as a single event upset (SEU). A SEU is an unwanted change of the data in a state element, such as, for example, a register. As those of ordinary skill in the art will appreciate, an SEU is random in nature, and will often cause unwanted behavior in the device design when manifest.

Various techniques have been proposed to deal with the effects of an SEU. For example, triple mode redundancy (TMR) replicates a portion of the design twice, resulting in three separate identical design portions. Subsequently, these design portions can be checked against each other to ensure consistency. Although TMR is generally effective, it requires replicating the design, which adds to the size and costs associated with the design. Another technique to mitigate SEU effects is to record the same signal at three different times. More specifically, the same signal is sampled at three different times and then recorded into a state element. These state elements are later synchronized to ensure consistency between the signal samplings. Although this solution can be implemented without replicating the design portions, it still degrades the operating speed of the design.

SUMMARY

As stated above, aspects of the disclosed technology are directed towards modifying a circuit design to reduce the potential occurrence of single event upset errors during operation of a device manufactured from the synthesized design. In various implementations, the modifications operations will be carried out in conjunction with a synthesis process.

With various implementations of the invention, after a circuit design has been synthesized to a particular abstraction level, a static timing analysis procedure is run on the design. The amount of positive slack for paths within the design is determined based upon the static timing analysis procedure. Subsequently, delays are added to selected paths within the design based upon whether the path has any positive slack or not.

With further implementations, a circuit design having been synthesized to the register transfer level is modified in the manner described above. After which, a gate-level design is synthesized from the modified design. Subsequently, another static timing analysis procedure is carried out, this time on the gate-level design, and delays are again added to any paths with positive slack. In further implementations, any paths that have negative slack as a result of delays added prior to the gate-level synthesis may be adjusted such that the slack is within a threshold value of 0.

These and additional implementations of the disclosed technology will be further understood from the following detailed disclosure of illustrative embodiments.

BRIEF DESCRIPTION OF THE DRAWINGS

The present invention will be described by way of illustrative implementations shown in the accompanying drawings in which like references denote similar elements, and in which:

FIG. 1 shows an exemplary programmable computing device that various embodiments of the disclosed technology can be implemented with.

FIG. 4A shows an exemplary circuit design.

FIG. 4B shows the exemplary circuit design of FIG. 4A, modified according to various implementations disclosed herein.

DETAILED DESCRIPTION

The operations of the disclosed implementations may be described herein in a particular sequential order. However, it should be understood that this manner of description encompasses rearrangements, unless a particular ordering is required by specific language set forth below. For example, operations described sequentially may in some cases be rearranged or performed concurrently. Moreover, for the sake of simplicity, the illustrated flow charts and block diagrams typically do not show the various ways in which particular methods can be used in conjunction with other methods.

It should also be noted that the detailed description sometimes uses terms like "generate" to describe the disclosed implementations. Such terms are often high-level abstractions of the actual operations that are performed. The actual operations that correspond to these terms will often vary depending on the particular implementation.

Illustrative Operating Environment

Figure 1:
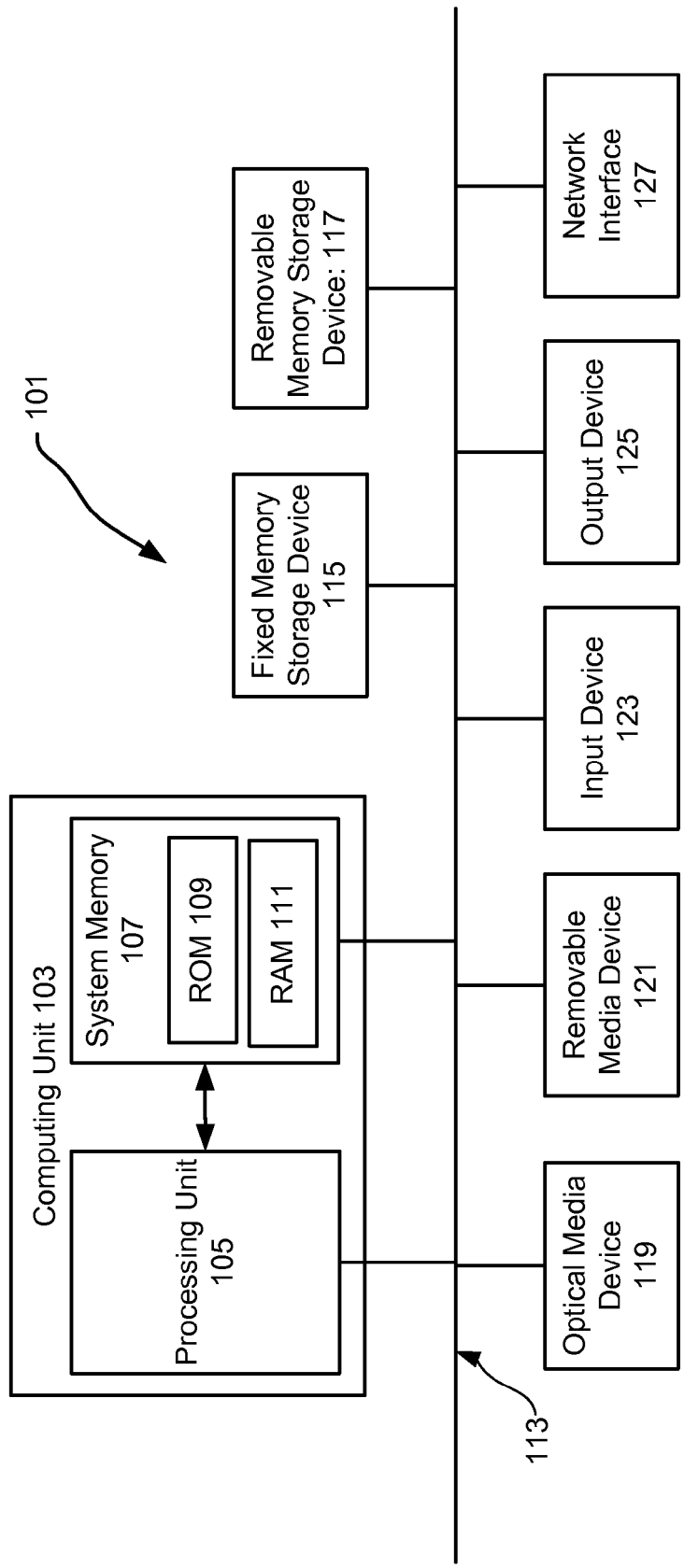

As the techniques of the present invention may be implemented using a programmable computer system executing software instructions, the components and operation of a computer system on which various implementations of the invention may be employed is described. Accordingly, FIG. 1 shows an illustrative computing device 101. As seen in this figure, the computing device 101 includes a computing unit 103 having a processing unit 105 and a system memory 107. The processing unit 105 may be any type of programmable electronic device for executing software instructions, but will conventionally be a microprocessor. The system memory 107 may include both a read-only memory ("ROM") 109 and a random access memory ("RAM") 111. As will be appreciated by those of ordinary skill in the art, both the ROM 109 and the RAM 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional devices, such as; a fixed memory storage device 115, for example, a magnetic disk drive; a removable memory storage device 117, for example, a removable solid state disk drive; an optical media device 119, for example, a digital video disk drive; or a removable media device 121, for example, a removable floppy drive. The processing unit 105 and the system memory 107 also may be directly or indirectly connected to one or more input devices 123 and one or more output devices 125. The input devices 123 may include, for example, a keyboard, a pointing device (such as a mouse, touchpad, stylus, trackball, or joystick), a scanner, a camera, and a microphone. The output devices 125 may include, for example, a monitor display, a printer and speakers. With various examples of the computing device 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus ("USB") connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol ("TCP") and the Internet protocol ("IP"). Also, the interface 127 may employ any suitable connection agent (or combination of agents) for connecting to a network, including, for example, a wireless transceiver, a modem, or an Ethernet connection.

It should be appreciated that the computing device 101 is shown here for illustrative purposes only, and it is not intended to be limiting. Various embodiments of the invention may be implemented using one or more computers that include the components of the computing device 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

As stated above, various embodiments of the invention may be implemented using a programmable computer system executing software instructions, a computer readable medium having computer-executable software instructions stored thereon, or some combination thereof. Particularly, these software instructions may be stored on one or more computer readable media or devices, such as, for example, the system memory 107, or an optical disk for use in the optical media device 119. As those of ordinary skill in the art will appreciate, software instructions stored in the manner described herein are inherently non-transitory in nature. More specifically, the software instructions are available for execution by the computer system 101, as opposed to being transmitted to the computer system via a carrier wave or some other transitory signal.

Synthesis for Single Event Upset Mitigation

Figure 2:
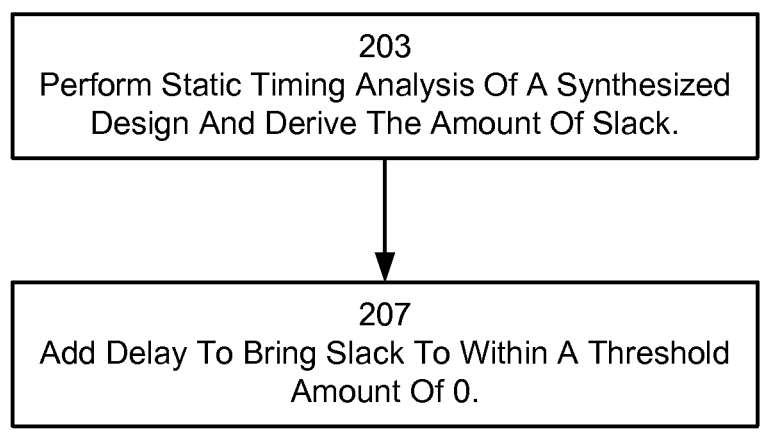
FIG. 2 illustrates an exemplary method for modifying a circuit design that can be performed by various implementations disclosed herein.
Figure 3:
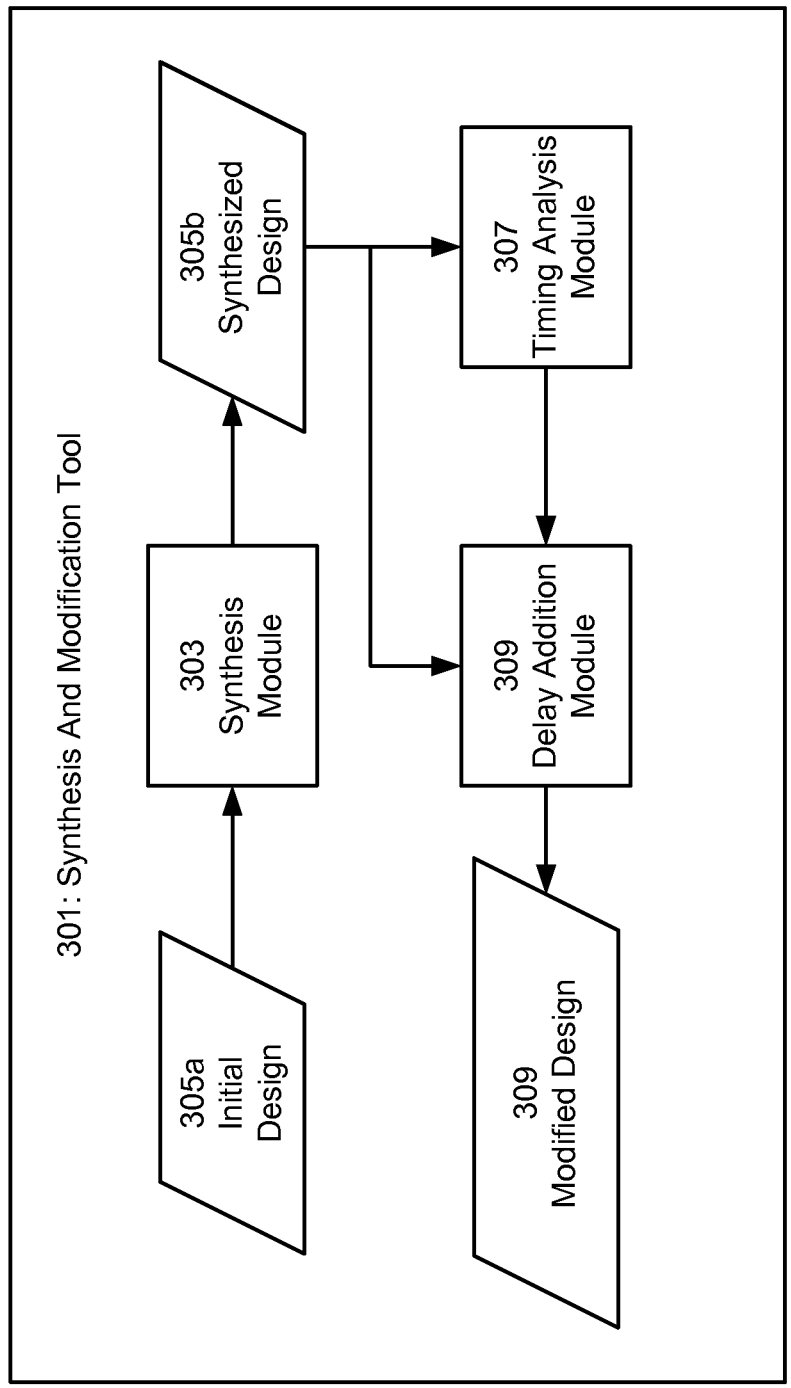
FIG. 3 shows an exemplary synthesis and circuit modification tool that can be provided according to various implementations disclosed herein.

As stated above, aspects of the disclosed technology are directed towards modifying a circuit design to reduce the potential occurrence of single event upset errors during operation of a device manufactured from the synthesized design. FIG. 2 illustrates a method 201 that may be implemented according to various embodiments of the present invention. Additionally, a schematic block diagram for a synthesis and modification tool 301, which may be used to perform the method 201, is shown in FIG. 3.

Reference to both FIGS. 2 and 3 will be made in describing the illustrative implementations detailed herein. Those of ordinary skill in the art will appreciate that although the method 201 is described with reference to the tool 301, other synthesis and modification tools or some combination of the tool 301 and other synthesis and modification tools may be used to perform the method 201. Similarly, although the synthesis and modification tool 301 is described with reference to the method 201, the tool 301 may be used to perform other methods or some combination of the method 201 and other methods.

As can be seen, the synthesis and modification tool (the "tool") 301 includes a synthesis module 303. As detailed above, "synthesis" is the process of transforming a circuit design 305 from one level of abstraction 305a to another level of abstraction 305b. For example, the initial circuit design 305a can be represented by the Verilog hardware description language at the RTL level. The synthesis module 303 can then synthesize the initial circuit design 305a into gate-level form, such that the synthesized circuit design 305b is represented as a netlist.

In various implementations, the synthesis module 303 is configured to perform "logic-level" synthesis, that is, the synthesis of a design initially represented in a hardware description langue to be represented by a netlist. With some implementations, the synthesis module 303 is configured to perform "high-level" synthesis, that is, the synthesis of a design initially represented in a high-level programming language to be represented by a hardware description language. In further implementations, the synthesis module 303 may be configured to perform both high-level and logic-level synthesis operations.

The method 201 includes an operation for performing a static timing analysis on the representation of the synthesized circuit design 305b and deriving the amount of slack within the design. As those of ordinary skill in the art will appreciate, static timing analysis is the process of determining the timing of a circuit. More specifically, as the operation of circuits is governed by a clock, static timing analysis determines the ability of the circuit to function within the clock frequency for which the circuit is governed. For example, FIG. 4A shows a schematic for a digital circuit design 401 including registers 403 and 405 having inputs 411 and outputs 413. As can be seen, a signal line 407 connects the output 413a of the register 403 to the input 411b of the register 405. Furthermore, a clock signal 409 having a period of 10 nanoseconds is shown. Accordingly, every 10 nanoseconds, the clock signal 409 will change logical state and cause the registers 403 and 405 to update their state based on the logical values of the respective inputs 411. These updated states will then be reflected on the respective outputs 413 of the registers 403 and 405.

As those of ordinary skill in the art will appreciate, it takes a certain amount of time for signals to propagate along signal lines, such as, the signal line 407. This time is referred to as "delay." The delay often includes the amount of time required for a change in state, such as, for example from a logic value of 0 to 1, to settle to an acceptable level that can be correctly recognized. FIG. 4 shows a delay 415 of 2 nanoseconds in the signal line 407. Accordingly, when the output 413a is updated, it will take 2 nanoseconds for the updated logical value to be reflected at the input 411b. The difference of the period of the clock 409 (i.e. 10 nanoseconds) and the delay 415 (i.e. 2 nanoseconds) is referred to as the slack, which for the example shown in FIG. 4 is 8 nanoseconds.

Returning to FIG. 2, as stated, the slack is derived by the operation 203. With some static timing analysis processes, the slack values are derived as part of the process. In other processes, the slack values may be derived based upon the determined timing (e.g., the delays). As those of ordinary skill in the art will appreciate, modern electronic designs typically have multiple signal lines 407. As such, there will be multiple slack values for a modern design, one for each signal line 407. Furthermore, typical circuits are much more complex than the circuit 401 shown in FIG. 4. For example, multiple clocks and clock domains are generally present in modern circuit designs. Those of ordinary skill in the art will appreciate how to perform a static timing analysis and derive the slack values for a circuit design without further explanation.

The tool 301 includes a timing analysis module 307 for performing the operation 203. Specifically, the timing analysis module 307 is configured to perform timing analysis procedures and derive the slack values for the synthesized circuit design 305b. A delay addition module 309 is also provided for modifying the synthesized circuit design 305b by adding delays into the design, resulting in a modified electronic design 311. The method 201 includes an operation 205 for modifying the synthesized circuit design 305b by adding delays to the design in order to bring the slack values for selected signal lines in the design to within a threshold value of 0. In some implementations, the operation 205 will operate upon every signal line in the synthesized circuit design 305b. In other implementations, only critical paths may be modified. With some implementations, only signal lines with a slack value higher than a specified value will be modified. With further implementations, the specified value may be defined in relation to the clock period. For example, in some implementations, only signal lines with a slack of more than 20% of the clock period may be adjusted.

As stated, the synthesized circuit design 305b is modified by adding delays into the circuit. The slack within a design (e.g., the circuit design 401) can be adjusted by modifying the design to add additional delays into the signal lines (e.g., the signal line 407) within the design. For example, FIG. 4B shows a schematic for a modified digital circuit design 421, which, as can be seen, is the digital circuit design 401 with the modification being an additional delay 417 of 8 nanoseconds added to the signal line 407. Consequently, the slack for the modified digital circuit design 421 is now 0. More particularly, the slack is the clock period less the delay, which for this example is 10 nanosecond-2 nanoseconds-8 nanoseconds.

In various implementations, the threshold value may be defined as a fixed value, such as, for example, 1 nanosecond. In other implementations, the threshold value may be defined as a percentage of the clock period, such as for example, 5%. As such, delays will be added to the signal lines in order to cause the slack to be 5%, or less of the clock period. Still, with other implementations, the threshold value may be defined in terms of an acceptable level of susceptibility that a single even upset (SEU) will affect the next states in the design. This will be better explained will reference to the example shown in FIG. 4A.

As stated above, an SEU is an unwanted change in the data stored within an element in the electronic design. For example, the registers 403 and 405 store either a logical 0 value or a logical 1 value. Accordingly, if the stored value changes unintentionally, that is without being triggered by the clock 409 and the input 411, this is referred to as an SEU. As those of ordinary skill in the art will appreciate, SEU's are unpredictable and occur as a result of physical phenomenon inherent in the operation of digital circuits. If an SEU occurred in the register 403, in the first 8 nanoseconds of a clock period, then the upset value (i.e. the SEU value) will be reflected on the input 411b of the register 405 prior to the end of the clock period. As a result, the SEU value will be used to determine the updated value to store in the register 405 for the next clock period. Since an SEU occurring within the first 80% of the clock period will affect the outcome (i.e. the next states), it is said that there is an 80% susceptibility to an SEU. If the acceptable level of SEU susceptibility were 1%, then the delay for the signal line 407 would need to be less than 0.1 nanosecond. In various implementations of the invention, the threshold value will be between 0.01% and 1% of the SEU susceptibility level.

With various implementations, the delay addition module may add to synthesized circuit design 305b by reducing the strength of the "drivers" for the signal lines. As those of ordinary skill in the art will appreciate, the driver controls the amount of current flowing thru the signal lines. As such, reducing the driver strength will reduce the speed with which the signals settle, thus increasing the delay. In some implementations, delays may be added by adding buffers in the signal lines. For example, a buffer could be added into the signal line 407 between the output 413a and the input 411b to increase the delay of the signal line 407.

Iterative Synthesis Process for Single Event Upset Mitigation

Figure 5:
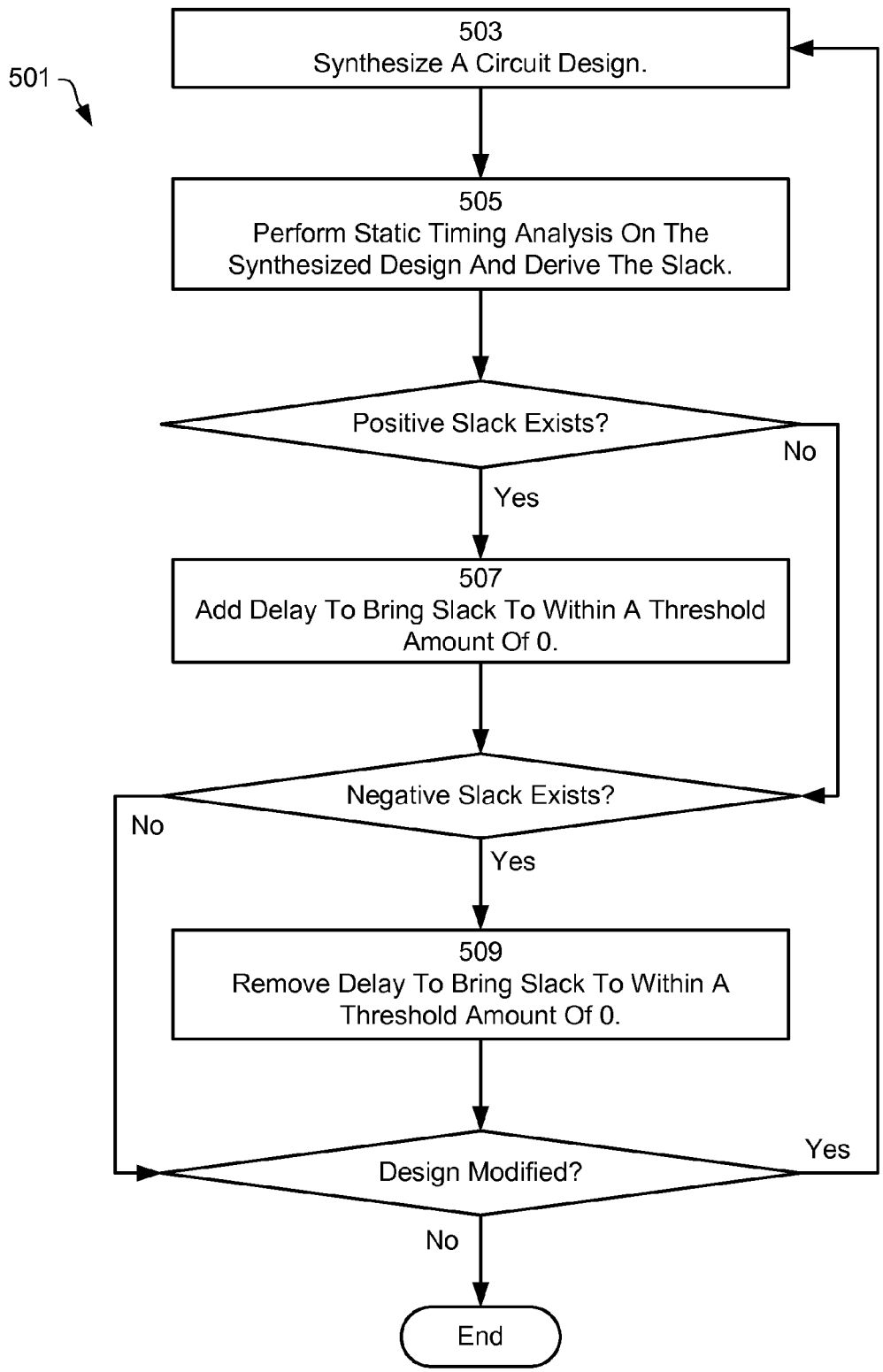
FIG. 5 illustrates an exemplary method for modifying a circuit design that can be performed by various implementations disclosed herein.

FIG. 5 shows a method 501 that may be provided according to various implementations of the present invention. Like the method 201, the method 501 is described with reference to the tool 301. However, other suitable synthesis and modification tools may be used, or some combination of the tool 301 and other tools may be used to perform the method 501. With some implementations, the method 501 may be performed after the method 201.

As can be seen from this figure, the synthesized circuit design 305b is synthesized from the initial circuit design 305a by operation 503. Static timing analysis is performed on the synthesized circuit design 305b and slack values are then derived at operation 505. Subsequently, as can be seen if positive slack values exist, then delays are added to the synthesized design 305b to adjust the slack values to be within a threshold value of 0 at operation 507. The various techniques for adding delays and determining which signal lines to adjust described above may be applied by the operation 507. In some implementations, the operation 503 is a place and route process. With some implementations, the operation 503 is an RTL synthesis process.

Returning to FIG. 4A, the slack value for the signal line 407 is 8 nanoseconds, which is a positive number. However, as those of ordinary skill in the art will appreciate, slack values could be negative. More specifically, if the delay 415 were larger than the clock period, then the slack would be negative. Accordingly, slack is often referred to as "positive slack" and "negative slack." As used herein, positive slack corresponds to where the total delay for the signal line is less than the clock period and negative slack refers to where the total delay for the signal line is larger than the clock period.

As those of ordinary skill in the art will appreciate, during place and route process, such as, for example, the process applied by the operation 503 can cause the slack values to be adjusted. Accordingly, if positive slack exists within the placed and routed design, the operation 507 can be applied to the synthesized circuit design 305b in order bring the slack values to within a threshold level of 0. Furthermore, an operation 509 is provided for removing delays from the synthesized circuit design 305b in order to reduce the total delay and bring any negative slack to within a threshold value of 0.

The method 501 then provides that if the synthesized circuit design 305b was modified (e.g., by performance of the operation 507 or 509) the method 501 returns to the operation 503 to reapply the synthesis process to the modified design 309. As can be seen, the method 501 can be repeated until all slack levels are within the acceptable threshold value.

CONCLUSION

Although certain devices and methods have been described above in terms of the illustrative embodiments, the person of ordinary skill in the art will recognize that other embodiments, examples, substitutions, modification and alterations are possible. It is intended that the following claims cover such other embodiments, examples, substitutions, modifications and alterations within the spirit and scope of the claims.

What is claimed is:
1. A method comprising:
receiving a predetermined single event upset susceptibility threshold value;
performing, with a computer implemented synthesis and modification tool, a static timing analysis of a circuit design;
identifying, from timing data produced by the static timing analysis, a signal path within the circuit design that has positive slack; and
adding a delay to the signal path, based upon the predetermined single event upset susceptibility threshold value, by modifying circuit components in the signal path.
2. The method of claim 1, wherein the circuit design is a gate level design produced from synthesis of a register transfer level design.
3. The method of claim 1, wherein the circuit design is a placed-and-routed design.
4. The method of claim 1, wherein the predetermined single event upset susceptibility threshold value is zero.
5. The method of claim 1, further comprising:
adding the delay to the signal path by reducing a strength of a driver on the signal path.
6. The method of claim 1, further comprising:
adding the delay to the signal path by adding buffers in the signal path.
7. The method of claim 1, wherein the adding of the delay to the signal path is based upon the positive slack being greater than a duration associated with the predetermined single event upset susceptibility threshold value.
8. The method of claim 1, further comprising:
performing the static timing analysis on the circuit design with the delay added to the signal path;
determining that timing of the signal path with the delay added is not within the predetermined single event upset susceptibility threshold value; and
adding, in response to the determining, additional delay to the signal path.
9. An apparatus comprising:
a microprocessor and memory storing software instructions, that when executed by the microprocessor, cause the apparatus to:
receive a predetermined single event upset susceptibility threshold value;
perform a static timing analysis of a circuit design;
identify from timing data produced by the static timing analysis, a signal path within the circuit design that has positive slack; and
add a delay to the signal path, based upon the predetermined single event upset susceptibility threshold value, by modifying circuit components in the signal path.
10. The apparatus of claim 9, wherein the software instructions, when
executed by the microprocessor, further cause the apparatus to:
perform the static timing analysis on the circuit design with the delay added to the signal path;
determine that timing of the signal path with the delay added is not within the predetermined single event upset susceptibility threshold value; and
add, in response to the timing of the signal path with the delay added not being within the predetermined single event upset susceptibility threshold value, additional delay to the signal path.
11. The apparatus of claim 9, wherein the circuit design is a gate level design produced from synthesis of a register transfer level design.
12. The apparatus of claim 9, wherein the circuit design is a placed-and-routed design.
13. The apparatus of claim 9, wherein the predetermined single event upset susceptibility threshold value is zero.
14. The apparatus of claim 9, wherein the software instructions, when
executed by the microprocessor, further cause the apparatus to:
add the delay to the signal path by reducing a strength of a driver on the signal path.

15. The apparatus of claim 9, wherein the software instructions, when
executed by the microprocessor, further cause the apparatus to:
add the delay to the signal path by adding buffers in the signal path.

16. The apparatus of claim 9, wherein the software instructions, when executed by the microprocessor, further cause the apparatus to add the delay to the signal path based upon the positive slack being greater than a duration associated with the predetermined single event upset susceptibility threshold value.

\* \* \* \* \*